Figure 1:
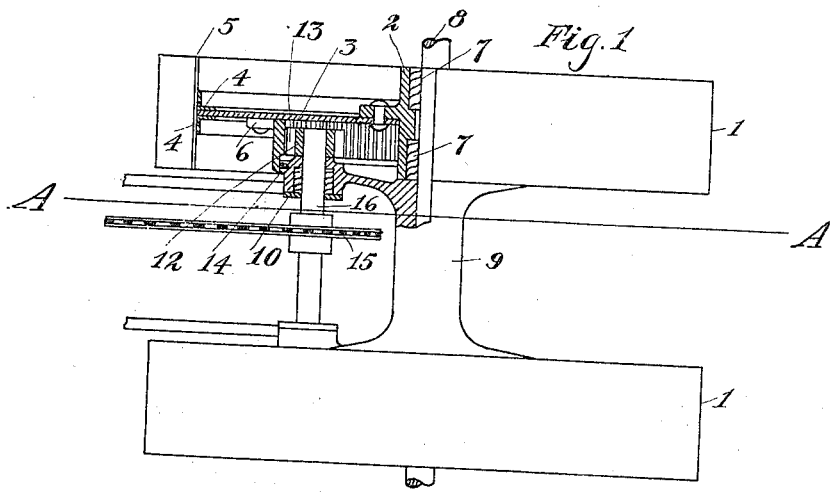

L. A. LA FOND.
BULL GEAR AND DRIVING WHEEL FOR TRACTION ENGINES.
APPLICATION FILED MAY 5, 1916.

1,254,241.

Patented Jan. 22, 1918.

Inventor:
Louis A. LaFond.
by C. D. Enochs
Attorney.

UNITED STATES PATENT OFFICE.

LOUIS A. LA FOND, OF MINNEAPOLIS, MINNESOTA.

BULL-GEAR AND DRIVING-WHEEL FOR TRACTION-ENGINES.

1,254,241.   Specification of Letters Patent.   Patented Jan. 22, 1918.

Application filed May 5, 1916. Serial No. 95,699.

*To all whom it may concern:*

Be it known that I, LOUIS A. LA FOND, a citizen of the United States, residing at Minneapolis, in the county of Hennepin and State of Minnesota, have invented certain new and useful Improvements in Bull-Gears and Driving-Wheels for Traction-Engines.

One object of my invention is to provide means for running a bull gear in an oil tight case, so that the oil may be retained therein, and dust and dirt excluded therefrom.

Another object of my invention is to provide a rigid and inexpensive means for mounting the bull gear on the driving wheels of the tractor.

With these and incidental objects in view the invention consists of certain novel features of construction and combination of parts, the essential elements of which are hereinafter described with reference to the drawing which accompanies and forms a part of this specification.

Figure 2:
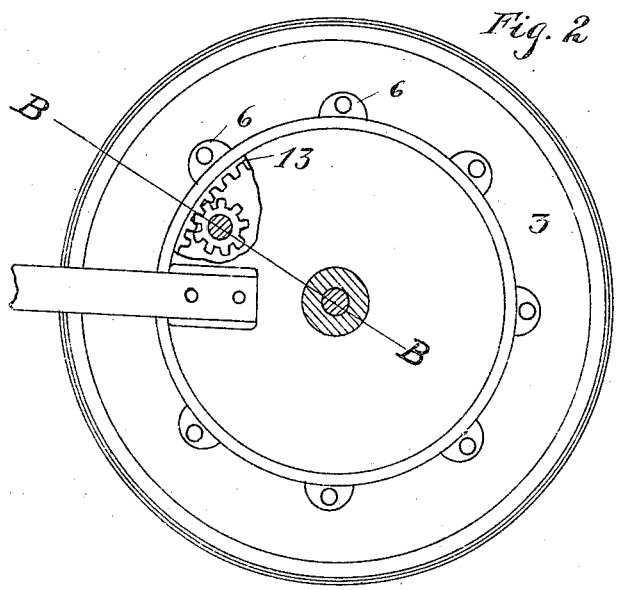

In the drawing, Figure 1 is a plan view of the driving wheels of a tractor to which my invention is applied, with a section taken on the line "BB," Fig. 2, to disclose the inside of the gear case, and Fig. 2 is a section taken on the line "AA," Fig. 1, with a portion of the gear case broken away.

The driving wheels 1, Fig. 1, comprise the hub flange casting 2, to which is riveted a disk 3, to the outer perimeter of which are riveted the angles 4, to which the tread 5 is riveted, the tread 5 being merely a band of iron of suitable weight and width.

The bull gear 13, which is of the internal type, has lugs 6, better shown in Fig. 2, by which it is riveted or bolted to the disk 3.

The hub flange casting 2 is mounted by suitable roller bearings 7 on the dead axle 8, Fig. 1.

Carried by the dead axle 8 the spool shaped casting 9 carries a suitable roller bearing 10 for the bull pinion shaft 11, carrying the bull pinion 12, which meshes with and drives the bull gear 13.

The bull gear casting and the spool shaped casting 9 have annular grooves turned therein to receive the felt washer 14, which excludes dust, and retains oil in the gear case formed between the flange of the casting 9, the outer ring of the bull gear itself and the disk 3.

A sprocket and chain 15 serve to drive the bull pinion shaft 11, and the bull pinion, case and gear of the other driving wheel would of course be identical.

While I have described my invention and illustrated it in one particular design, I do not wish it understood that I limit myself to this construction, as it is evident that the application of my invention may be varied in many ways within the scope of the following claims.

Claims:

1. In a driving wheel and bull gear, the combination of a dead shaft, two hub flanges journaled on said dead shaft, a disk concentrically mounted on each of said hub flanges and rigidly attached thereto, a wheel rim rigidly carried by the outer periphery of each of said disks, a bull gear mounted on the inner side of each of said disks, a double flanged pinion member mounted on said dead shaft, one of said flanges being positioned so as to close the inner side of one of said bull gears, and the other of said flanges being positioned so as to close the inner side of the other of said bull gears, an aperture in each of said flanges, a bull pinion shaft journaled in said aperture, and a bull pinion at each end of said bull pinion shaft coacting with said bull gears.

2. In a driving wheel and bull gear the combination of a dead shaft, a spool shaped pinion support mounted on said shaft and having a flange at each end thereof, each of said flanges having an aperture therein, a bull pinion shaft journaled in each of said apertures, a bull pinion carried by each of said bull pinion shafts, a disk mounted on each end of said dead shaft, and an internal bull gear carried by each of said disks and coacting with the respective bull pinion, the flanges of said spool shaped pinion support closing the inner side of each of said bull gears, an oil retainer being positioned between each of said bull gears and the co-acting flange of said support to retain oil within said bull gear.

LOUIS A. LA FOND.